United States Patent
Namiki et al.

(10) Patent No.: US 8,629,235 B2
(45) Date of Patent: Jan. 14, 2014

(54) PRODUCTION METHOD OF POLYCARBONATE

(71) Applicant: Mitsubishi Chemical Corporation, Chiyoda-ku (JP)

(72) Inventors: Shingo Namiki, Fukuoka (JP); Takehito Nagao, Fukuoka (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/936,630

(22) Filed: Jul. 8, 2013

(65) Prior Publication Data

US 2013/0296526 A1 Nov. 7, 2013

Related U.S. Application Data

(63) Continuation of application No. PCT/JP2012/050097, filed on Jan. 5, 2012.

(30) Foreign Application Priority Data

Jan. 7, 2011 (JP) ................................. 2011-001790

(51) Int. Cl.
*C08G 63/02* (2006.01)
*C08G 64/00* (2006.01)

(52) U.S. Cl.
USPC ............................ 528/271; 528/272; 528/370

(58) Field of Classification Search
USPC .......................................... 528/370, 271, 272
See application file for complete search history.

(56) References Cited

U.S. PATENT DOCUMENTS

2011/0034646 A1  2/2011  Fuji et al.

FOREIGN PATENT DOCUMENTS

| | | |
|---|---|---|
| EP | 1 657 272 | 5/2006 |
| EP | 2 354 175 | 8/2011 |
| JP | 09-165443 | 6/1997 |
| JP | 2006-028441 | 2/2006 |
| JP | 2006-232897 | 9/2006 |
| JP | 2008-024919 | 2/2008 |
| JP | 2008-056844 | 3/2008 |
| JP | 2009-091404 | 4/2009 |
| JP | 2009-091417 | 4/2009 |
| JP | 2009-161745 | 7/2009 |
| JP | 2010-150540 | 7/2010 |
| JP | 2010-222589 | 10/2010 |
| WO | 2004/111106 | 12/2004 |
| WO | 2005/019302 | 3/2005 |
| WO | 2009/075305 | 6/2009 |
| WO | 2010/061926 | 6/2010 |

OTHER PUBLICATIONS

International Search Report issued Apr. 10, 2012 in PCT/JP2012/050097 filed Jan. 5, 2012.

*Primary Examiner* — Terressa Boykin

(74) *Attorney, Agent, or Firm* — Oblon, Spivak, McClelland, Maier & Neustadt, L.L.P.

(57) ABSTRACT

A method for producing a polycarbonate, comprises: continuously feeding a dihydroxy compound having a portion represented by —(—$CH_2$—O—)— in a part of a structure thereof and a carbonic acid diester; and continuously performing polycondensation to produce a polycarbonate, wherein the method satisfies all of the conditions: (A) at least two reactor vessels connected in series are used; (B) a reaction solution reacted in a first reactor of the first vessel is continuously fed to a reactor of the second vessel; (C) the first reactor is equipped with a reflux condenser; and (D) a reflux ratio in the first reactor is from 0.01 to 10 based on a distillate volume.

14 Claims, 1 Drawing Sheet

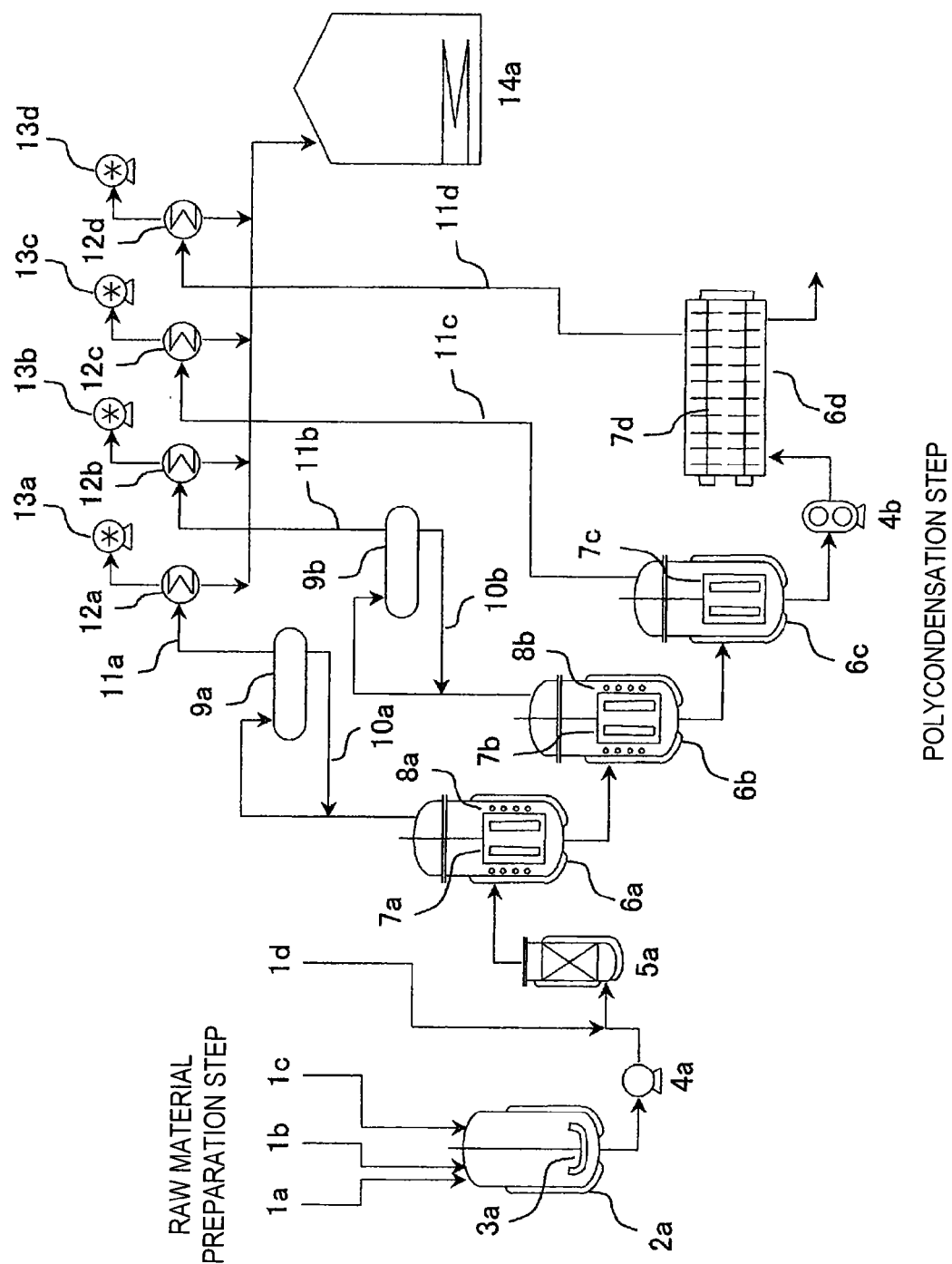

US 8,629,235 B2

PRODUCTION METHOD OF POLYCARBONATE

TECHNICAL FIELD

The present invention provides a method for efficiently and stably producing a polycarbonate that is excellent in the light resistance, transparency, color hue, heat resistance, thermal stability, mechanical strength and the like.

BACKGROUND ART

A polycarbonate generally contains bisphenols as a monomer component, and taking advantage of its superiority in transparency, heat resistance, mechanical strength and the like, the polycarbonate is widely utilized as a so-called engineering plastic, for example, in the fields of electrical/electronic part and automotive part and in the optical field such as optical recording medium and lens.

The conventional polycarbonate is produced using a raw material derived from a petroleum resource, but in recent years, the depletion of petroleum resources is concerned, and it is demanded to supply a polycarbonate using a raw material obtained from a biomass resource such as plant. Also, to avoid the fear that the global warming caused by an increase in the carbon dioxide emission and an accumulation thereof may bring about climate change, it is demanded to develop a polycarbonate starting from a plant-derived monomer that is carbon-neutral even when discarded after use.

Under these circumstances, there has been proposed a method where isosorbide (ISB) that is a dihydroxy compound obtained from a biomass resource is used as a monomer component and a polycarbonate is obtained through transesterification with a carbonic acid diester while distilling off a monohydroxy compound byproduct under reduced pressure (see, for example, Patent Documents 1 to 7).

However, a dihydroxy compound such as isosorbide (ISB) has a low boiling point as compared with bisphenols and therefore, its significant volatilization takes place during the transesterification reaction performed at a high temperature under reduced pressure, giving rise to a problem that not only the raw material consumption rate is worsened but also in the case of using a plurality of kinds of dihydroxy compounds, the molar ratio of the dihydroxy compounds used is changed during polymerization to make it impossible to obtain a polycarbonate having a desired molecular weight or composition.

In order to solve such a problem, there have been proposed a method of performing the reaction under an ordinary pressure in the initial stage of the reaction, thereby consuming the monomer and preventing its volatilization, and a method using a polymerization reactor with a specific reflux condenser (see, Patent Document 8).

However, the studies by the present inventors have revealed that the conventional method involves worsening of the color tone of the polycarbonate obtained. This is because the transesterification reaction is an equilibrium reaction, in other words, the reaction is accelerated by removing the reaction byproduct from the reaction system, and when the volatilization of the monomer is suppressed at the initial stage of the reaction, the reaction rate is inhibited at the same time, as a result, the heat history applied to the reaction is increased and furthermore, a thermal decomposition product stays in the reaction system. In particular, a polycarbonate starting from the dihydroxy compound having a specific structure of the present invention is poor in the thermal stability as compared with the conventional polycarbonate starting from bisphenols and therefore, the worsening of the color tone is outstanding.

Also, the transesterification method using diphenyl carbonate as the carbonic acid diester involves generation of a large amount of a phenol byproduct and as the method for treating the byproduct phenol, there has been proposed a method of recovering the byproduct phenol by distillative purification and reutilizing it as a raw material of diphenyl carbonate or bisphenol A (see, for example, Patent Document 9).

BACKGROUND ART DOCUMENT

Patent Document

Patent Document 1: International Publication No. 04/111106
Patent Document 2: JP-A-2006-232897 (the term "JP-A" as used herein means an "unexamined published Japanese patent application")
Patent Document 3: JP-A-2006-28441
Patent Document 4: JP-A-2008-24919
Patent Document 5: JP-A-2009-91404
Patent Document 6: JP-A-2009-91417
Patent Document 7: JP-A-2009-161745
Patent Document 8: JP-A-2008-56844
Patent Document 9: JP-A-9-165443

The dihydroxy compound having a specific structure typified by isosorbide has a low molecular weight as compared with bisphenols and in turn, allows for production of a monohydroxy compound such as phenol in a larger amount per unit polymer amount than in the conventional polycarbonate, and from the aspect of production cost and effective utilization of resources, it is demanded to more reutilize the monohydroxy compound.

However, according to the studies by the present inventors, there has been found a problem that as described above, the aliphatic dihydroxy compound readily volatilizes and gives a liquid distillate containing a large amount of impurities and the burden on the recovery cost of a monohydroxy compound such as phenol becomes high. Accordingly, a measure for solving both this problem and the quality improvement of a polycarbonate is demanded.

SUMMARY OF INVENTION

Problem that Invention is to Solve

An object of the present invention is to solve those conventional problems and provide a method for efficiently and stably producing a polycarbonate having a desired molecular weight and a desired composition, which is excellent in the light resistance, transparency, color hue, heat resistance, thermal stability, mechanical strength and the like, by reducing the distillate volume of a dihydroxy compound in the liquid distillate upon recovery of a monohydroxy compound such as phenol.

Means for Solving Problem

As a result of many intensive studies to attain the above-described object, the present inventors have found that when in the method of producing a polycarbonate by polycondensing a dihydroxy compound and a carbonic acid diester, at least two or more reactor vessels are used and the first-stage reactor is a specific reactor, a polycarbonate excellent in the light resistance, transparency, color hue, heat resistance, thermal stability, mechanical strength and the like can be efficiently and stably produced. The present invention has been accomplished based on this finding. That is, the gist of the present invention resides in the following [1] to [14].

[1] A method for producing a polycarbonate, comprising:
continuously feeding a dihydroxy compound containing a dihydroxy compound having a portion represented by the following formula (1) in a part of a structure thereof and a carbonic acid diester; and
continuously performing polycondensation to produce a polycarbonate,
wherein all of the following conditions (A) to (D) are satisfied:
(A) at least two reactor vessels connected in series are used,
(B) a reaction solution reacted in a first reactor of the first vessel is continuously fed to a second reactor of the second vessel,
(C) the first reactor is equipped with a reflux condenser, and
(D) a reflux ratio in the first reactor is from 0.01 to 10 based on a distillate volume:

[Chem. 1]

(1)

(provided that a case where the portion represented by formula (1) is a portion constituting a part of —$CH_2$—OH is excluded).

[2] The production method of a polycarbonate as described in [1],
wherein an internal temperature of the first reactor is from 150 to 250° C. and a variation of the internal temperature is within 10° C.

[3] The production method of a polycarbonate as described in [1] or [2],
wherein an internal pressure of the first reactor is from 5 to 80 kPa and a variation of the internal pressure is within 5 kPa.

[4] The production method of a polycarbonate as described in any one of [1] to [3],
wherein a temperature of a heating medium of the first reactor is 265° C. or less and a temperature difference from an internal temperature of the first reactor is from 5 to 80° C.

[5] The production method of a polycarbonate as described in any one of [1] to [4],
wherein the second reactor is equipped with a reflux condenser.

[6] The production method of a polycarbonate as described in any one of [1] to [5],
wherein an internal volume of the first reactor is 20 L or more.

[7] The production method of a polycarbonate as described in any one of [1] to [6],
wherein a distillate volume of a monohydroxy compound generated as a by-product by a transesterification reaction in the first reactor is from 30 to 90% of a theoretical amount.

[8] The production method of a polycarbonate as described in any one of [1] to [7],
wherein a content of a monohydroxy compound in the reaction solution at an outlet of the first reactor is 20 wt % or less.

[9] The production method of a polycarbonate as described in any one of [1] to [8],
wherein out of the dihydroxy compounds, a boiling point at 5 kPa of at least one dihydroxy compound is 250° C. or less.

[10] The production method of a polycarbonate as described in any one of [1] to [9],
wherein an average molecular weight of the dihydroxy compound used for reaction is 220 or less.

[11] The production method of a polycarbonate as described in any one of [1] to [10],
wherein the dihydroxy compound having the portion represented by formula (1) is a compound having a cyclic ether structure.

[12] The production method of a polycarbonate as described in any one of [1] to [11],
wherein the dihydroxy compound having the portion represented by formula (1) is a compound represented by the following formula (2):

[Chem. 2]

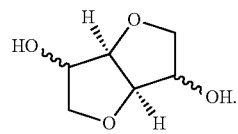
(2)

[13] The production method of a polycarbonate as described in any one of [1] to [12], comprising:
a step of distilling and purifying a monohydroxy compound from liquid distillates coming out of all reactors and recovering the monohydroxy compound.

[14] The production method of a polycarbonate as described in any one of [7] to [13],
wherein the monohydroxy compound is phenol.

Effects of Invention

By the production method of a polycarbonate of the present invention, a polycarbonate excellent in the light resistance, transparency, color hue, heat resistance, thermal stability, mechanical strength and the like can be efficiently and stably produced. In particular, according to the production method of a polycarbonate of the present invention, distillation of a dihydroxy compound as a raw material can be suppressed and the cost for purification or disposal of the liquid distillate can be kept low to allow for efficient recycling. Furthermore, even in the case of using a plurality of kinds of dihydroxy compounds and performing copolymerization, distillation of dihydroxy compounds are reduced and therefore, the charge composition can be stably copolymerized as it is.

BRIEF DESCRIPTION OF DRAWING

FIG. 1 is a flow chart showing one example of the production process in the production method of a polycarbonate of the present invention.

MODE FOR CARRYING OUT INVENTION

The mode for carrying out the present invention is described in detail below, but the constituent features described below are mere examples (representative examples) of the embodiment of the present invention and as long as the gist of the invention is observed, the present invention is not limited to the following contents.
Incidentally, the expression "(numerical or physical value) to (numerical or physical value)" as used in the description of the invention is intended to include the numerical or physical values before and after "to".

The production method of a polycarbonate of the present invention is a method for producing a polycarbonate, comprising continuously feeding a dihydroxy compound containing a dihydroxy compound having a portion represented by the following formula (1) in a part of the structure and a carbonic acid diester, and continuously performing polycondensation to produce a polycarbonate, wherein all of the following conditions (A) to (D) are satisfied:

(A) at least two reactor vessels connected in series are used,
(B) a reaction solution reacted in a first reactor of the first vessel is continuously fed to a second reactor of the second vessel,
(C) the first reactor is equipped with a reflux condenser, and
(D) the reflux ratio in the first reactor is from 0.01 to 10 based on the distillate volume:

[Chem. 3]

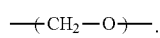 (1)

However, a case where the portion represented by formula (1) is a portion constituting a part of —$CH_2$—OH is excluded.

<Polycarbonate Production Process>

In the method of the present invention, the above-described dihydroxy compound and a carbonic acid diester are reacted (melt polycondensation) in a multistage process including two or more stages by using at least two reactor vessels connected in series usually in the presence of a polymerization catalyst (hereinafter, sometimes referred to as "catalyst" or "transesterification reaction catalyst") to produce a polycarbonate.

In the following, when a plurality of reactor vessels are used, the reactor of the first vessel, the reactor of the second vessel, the reactor of the third vessel, . . . are referred to as a first reactor, a second reactor, a third reactor . . . , respectively.

The polymerization step is divided into two stages of early-stage reaction and later-stage reaction. The early-stage reaction is usually performed at a temperature of preferably from 150 to 270° C., more preferably from 170 to 230° C., preferably for 0.1 to 10 hours, more preferably from 0.5 to 3 hours, to distill out a byproduct monohydroxy compound generated and produce an oligomer.

In the later-stage reaction, the pressure in the reaction system is gradually reduced from that in the early-stage reaction, the reaction temperature is also gradually raised, and finally, under a pressure in the reaction system of 2 kPa or less, a polycondensation reaction is preformed usually at a temperature of preferably from 200 to 280° C., more preferably from 210 to 260° C., while removing a monohydroxy compound generated at the same time to the outside of the system, whereby a polycarbonate is produced.

Incidentally, the pressure as used in this description indicates a so-called absolute pressure based on a vacuum.

The reactor used in this polymerization step is a reactor constructed by connecting at least two vessels, where a reaction solution flowed out of the outlet of the first reactor enters the second reactor. The number of reactors connected is not particularly limited but is preferably from 2 to 7, more preferably from 3 to 5, still more preferably 3 or 4.

The type of the reactor is also not particularly limited, but the reactor of the early-stage reaction is preferably a reactor including one or more vertical stirring reactor vessels, and the reactor of the later-stage reaction is preferably a reactor including one or more horizontal stirring reactor vessels. In the case of providing a plurality of reactors, these are preferably set to stepwise raise the temperature and stepwise reduce the pressure from one reactor to another reactor.

In the first reactor, the distillate volume of the monohydroxy compound byproduct generated by the transesterification reaction is preferably from 30% to 90% based on the theoretical amount. If the distillate volume is too small, the productivity tends to decrease, whereas if the distillate volume is too large, the heat history applied is excessive, and the quality of the polycarbonate tends to be worsened.

In the first reactor, the distillate volume of the monohydroxy compound is more preferably 40% or more, still more preferably 50% or more, and on the other hand, more preferably 85% or less, still more preferably 80% or less. The distillate volume of the monohydroxy compound in the first reactor is controlled by the later-described reaction temperature, reaction pressure, residence time or catalyst amount.

Here, the theoretical amount of the monohydroxy compound byproduct is a value (weight) obtained by multiplying the molecular weight of a monohydroxy compound by two times the number of moles of the carbonic acid diester used for the reaction.

Also, the content of the monohydroxy compound in the reaction solution at the outlet of the first reactor is preferably 20 wt % or less in view of quality of the polycarbonate. If the monohydroxy compound stays in the reaction system for a long time, coloration or the like of the polycarbonate may be caused.

The content of the monohydroxy compound in the reaction solution at the outlet of the first reactor is more preferably 15 wt % or less. The content of the monohydroxy compound in the reaction solution at the outlet of the first reactor can be adjusted by the later-described pressure or reflux ratio, specifically, can be decreased by reducing the pressure or making the reflux ratio small.

The size of the reactor is not particularly limited, but the internal volume of the first reactor is preferably 20 L or more, more preferably 30 L ore more. The internal volume of the reactor of the second or subsequent vessel is preferably 10 L or more, though the optimum internal volume varies depending on the reaction scale or reaction conditions selected.

If the internal volume of the reactor is too small, the ratio of the volume of the pipe connecting reactors with each other to the volume of the entire reactor becomes large and an unnecessary residence time is spent in the pipe, which may cause quality deterioration of the polycarbonate. On the other hand, the internal volume of the reactor has no particular upper limit, but in view of reaction efficiency and practicability, the upper limit is 20 $m^3$.

The connection of the reactor above to the next reactor may be direct connection or may be connection through a pipe or the like, if desired. The pipe preferably uses a double pipe system or the like so that the reaction solution can be transferred without cool solidification, and a pipe having no gas phase part and inhibiting production of a dead space is preferred.

The heating medium for heating each of the reactors above is usually at a temperature of preferably 300° C. or less, more preferably 270° C. or less, still more preferably 260° C. or less. If the temperature of the heating medium is too high, thermal deterioration on the reactor wall surface may be accelerated to cause a problem such as increase of a heterostructure or a decomposition product or worsening of the color tone. The lower limit of the temperature is not particularly limited as long as it is a temperature capable of maintaining the above-described reaction temperature.

The reactor for use in the present invention may be any known reactor. Examples thereof include a jacket-type reactor using a hot oil or a steam as the heating medium, and a reactor having a coiled heat-transfer tube in the inside.

The method of the present invention is described in more detail below. The method of the present invention is performed by mixing, as raw material monomers, a dihydroxy compound containing a dihydroxy compound having a portion represented by formula (1) and a carbonic acid diester such as diphenyl carbonate (DPC), each in the molten state, to prepare a raw material mixture melt (raw material preparation step), and subjecting these compounds in the molten state to a multistage polycondensation reaction using a plurality of reactors in the presence of a polymerization catalyst (polycondensation step). In the case of using DPC, a phenol byproduct is generated as a monohydroxy compound and therefore, the reaction is performed under reduced pressure and allowed to proceed by removing the phenol from the reaction system, whereby a polycarbonate is produced.

The reaction system is a continuous system, and as for the reactor, a plurality of vertical stirring reactor vessels and subsequently thereto, at least one horizontal stirring reactor vessel are preferably used. Usually, these reactors are disposed in series and the processing is continuously performed.

After the polycondensation step, for example, a step of devolatizing and removing an unreacted raw material or a monohydroxy compound which is a reaction byproduct in the polycarbonate, a step of adding a thermal stabilizer, a release agent, a colorant or the like, and a step of forming the obtained polycarbonate into a pellet having a predetermined particle diameter, may be appropriately added.

The generated monohydroxy compound such as phenol is collected in a tank or the like and in view of effective utilization of resources, this monohydroxy compound is preferably recovered after purification, if desired, and then reutilized as a raw material of DPC, bisphenol A or the like.

In the production method of the present invention, the method for purifying the byproduct monohydroxy compound is not particularly limited, but a distillation method is preferably used. In this case, the distillation may be simple distillation or continuous distillation and is not particularly limited, but in view of purification efficiency and productivity, continuous distillation using a plurality of distillation towers each having provided therein theoretical plates is preferred.

In the case of using two distillation tower units, in a first distillation tower, distillation is performed under reduced pressure while applying reflux, and the light boiling point component is distilled off together with a part of the monohydroxy compound from the top, whereas the bottom product is fed to a second distillation tower. In the second distillation tower, distillation is performed under the condition of a more reduced pressure than in the first distillation tower, and the purified monohydroxy compound such as phenol is recovered from the top. Also, in the present invention, it is preferred to include a step of distilling and purifying a monohydroxy compound from the liquid distillates coming out of all reactors and recovering the monohydroxy compound.

As the purity of the monohydroxy compound before purification is higher, the purification is easier. Therefore, the production cost of the distillation tower can be reduced by decreasing the theoretical plates of the distillation tower. In addition, since the amount of the waste produced in distillation becomes small, the waste treatment cost can be also reduced.

Each step of the production method is described below.
<Raw Material Preparation Step>

The dihydroxy compound containing a dihydroxy compound having a portion represented by formula (1) and a carbonic acid diester, which are used as raw materials of the polycarbonate, are usually prepared as a raw material mixture melt by using a batch, semi-batch or continuous stirring tank-type apparatus in an atmosphere of an inert gas such as nitrogen or argon.

For example, in the case of using ISB as the dihydroxy compound having a portion represented by formula (1) together with the later-described dihydroxy compound of an alicyclic hydrocarbon and using DPC as the carbonic acid diester, the melt mixing temperature is selected in the range of usually from 80 to 180° C., preferably from 90 to 120° C.

An antioxidant and the like may be also added to the raw material mixture melt. By adding a commonly known hindered phenol-based antioxidant or phosphorus-based antioxidant, the storage stability of the raw material in the raw material preparation step can be enhanced. In addition, coloration during polymerization is suppressed, whereby the color tone of the polycarbonate obtained can be improved.

The polymerization catalyst used is usually prepared as an aqueous solution in advance. The concentration of the catalyst aqueous solution is not particularly limited and is adjusted to an arbitrary concentration according to the solubility of the catalyst in water. Instead of water, other solvents such as acetone, alcohol, toluene and phenol may be selected. Specific examples of the polymerization catalyst are described later.

The property of water used to dissolve the catalyst is not particularly limited as long as the kind and concentration of the impurity contained are constant, but usually, distilled water, deionized water or the like is preferably used.
<Early-Stage Reaction Step>

First, in the early-stage reaction step, a mixture of the above-described dihydroxy compound and a carbonic acid diester is fed in the molten state to preferably a vertical reactor and allowed to undergo a polycondensation reaction usually at a temperature of preferably from 150 to 270° C. to obtain an oligomer.

The early-stage reaction is usually performed continuously by using preferably one or more reactor vessels, more preferably from 2 to 6 vessels, and from 40 to 95% of the byproduct monohydroxy compound is preferably distilled off. The internal temperature of the reactor is usually, preferably from 150 to 280° C., more preferably from 160 to 240° C., and the internal pressure of the reactor is preferably from 80 to 1.3 kPa. In the case of a continuous reaction using a plurality of reactors, it is preferred to sequentially raise the internal temperature of respective reactors within the range above and sequentially lower the internal pressure of respective reactors within the range above. The average residence time is usually, preferably from 0.1 to 10 hours, more preferably from 0.5 to 5 hours, still more preferably from 0.5 to 3 hours.

In the method of the present invention, the reaction conditions of the first reactor in the early-stage reaction step are preferably determined carefully from a broad standpoint by considering not only the quality of the polycarbonate obtained but also, for example, the raw material consumption rate, the cost for purification of phenol from the liquid distillate recovered or the heat balance of the plant as a whole.

The internal temperature of the first reactor is preferably in a specific temperature range and less variable. Specifically, the internal temperature of the first reactor is preferably from 150 to 250° C., more preferably from 160 to 230° C. The variation of the internal temperature is preferably within 10° C., more preferably within 5° C., still more preferably within 3° C.

If the internal temperature of the first reactor is too high, this may lead to accelerated thermal deterioration or increased production of a heterostructure or a coloring component and incur worsening of the quality of the polycarbonate, or volatilization of the dihydroxy compound together with the monohydroxy compound such as phenol from the first reactor may be accelerated to give a liquid distillate containing many impurities or cause production of a polycarbonate having a composition different from the charge raw material composition.

On the other hand, if the internal temperature of the first reactor is too low, the reaction rate decreases, as a result, the color tone may be worsened or the productivity may be reduced. Also, if the internal temperature greatly varies, it may be difficult to stably produce a polycarbonate exhibiting good color hue and good thermal stability and having a desired composition.

Furthermore, the melt polycondensation reaction is an equilibrium reaction, in other words, the reaction is accelerated by removing the byproduct monohydroxy compound from the reaction system, and therefore, the system is preferably set to a decompressed state. The internal pressure of the first reactor is preferably from 5 to 80 kPa, more preferably from 5 to 40 kPa, still more preferably from 5 to 30 kPa.

If the internal pressure of the first reactor is too high, a monohydroxy compound is not distilled off, as a result, the reactivity and in turn, the productivity may be reduced. If the internal pressure of the first reactor is too low, an unreacted dihydroxy compound or a raw material such as carbonic acid diester is distilled off together with a monohydroxy compound, and the reaction can be hardly controlled, for example, the molar ratio of raw materials may deviate to fail in attaining a polycarbonate having a desired molecular weight or composition, or the raw material consumption rate may be worsened.

In addition, the variation of the internal pressure of the first reactor is preferably within 5 kPa, more preferably within 4 kPa. If the variation of the internal pressure is large, it may be difficult to stably produce a polycarbonate exhibiting good color hue or good thermal stability and having a desired composition.

The temperature of the heating medium for heating the first reactor is usually, preferably 265° C. or less, and the temperature difference from the internal temperature of the first reactor is preferably from 5 to 80° C. The temperature of the heating medium is more preferably 250° C. or less, still more preferably 235° C. or less. If the temperature of the heating medium is too high, when the reaction solution is attached to the wall surface of the first reactor, particularly, the wall surface in the gas phase part, thermal deterioration may occur to cause coloration.

Furthermore, the temperature difference between the temperature of the heating medium for heating the first reactor and the internal temperature of the first reactor is more preferably from 7 to 70° C., still more preferably from 10 to 60° C. If the temperature difference is too small, the following two things may be considered to be caused and in either case, the color tone may be worsened. One thing is that the reaction may not sufficiently proceed in the first reactor and due to a small amount of the monohydroxy compound produced, the heat loss by evaporation latent heat is reduced. Another thing is that the temperature of the raw material may be raised too high before the raw material is charged into the first reactor. In both cases, a heat load different from that in the progress of the reaction is imposed on the reaction solution and the color tone may be worsened. If the temperature difference is too large, coloration may occur due to excessive heating.

In the present invention, the second reactor is preferably equipped with a reflux condenser, similarly to the first reactor. Thanks to the attachment of a reflux condenser to the second reactor, the composition of the polycarbonate obtained may be stabilized or the amount of impurities in the recovered monohydroxy compound such as phenol may be reduced.

In order to achieve an effect of both suppressing the distillation of an unreacted raw material and accelerating the reaction by decompression, in the production method of the present invention, a reflux condenser is provided in the first reactor. However, if the reflux amount is excessively increased, that is, if the reflux ratio is set too large, the reflux liquid cooled in the reflux condenser need to be again heated in the first reactor. Then, the reaction solution in the first reactor is subject to excessive heating, and this may give rise to coloration.

If the reflux ratio is set too small, the above-described raw material monomer and the like may be distilled out of the system together with the byproduct monohydroxy compound, and a polycarbonate having a desired ratio of structural units may not be obtained.

In the first reactor, the amount of the byproduct monohydroxy compound generated is usually largest and therefore, if the amount of heat supplied to the first reactor is excessively increased, this often affects the heat balance of the plant as a whole and may cause a problem that the amount of heat supplied to other steps becomes insufficient.

From these various viewpoints, the reflux ratio in the first reactor is from 0.01 to 10 based on the distillate volume. The reflux ratio is preferably 0.03 or more, more preferably 0.05 or more, and on the other hand, preferably 7 or less, more preferably 5 or less, still more preferably 3 or less, yet still more preferably 1 or less, even yet still more preferably 0.4 or less. The reflux ratio in the first reactor can be controlled by adjusting each of the pressure in the reactor and the condensation temperature of the monohydroxy compound vapor in the reflux condenser.

Furthermore, as the average molecular weight of the dihydroxy compound used for the reaction is smaller, the above-described plurality of problems become more serious. In the melt polycondensation reaction of the present invention, which is performed at a high temperature under reduced pressure, a dihydroxy compound having a low boiling point may be distilled off in the unreacted state and the reaction can be hardly controlled.

In addition, almost equivalent moles of a dihydroxy compound and a carbonic acid diester are usually charged and therefore, as the molecular weight of the dihydroxy compound is smaller, the amount of the carbonic acid diester required per unit polymer amount becomes larger, that is, the amount of the byproduct monohydroxy compound produced is increased, as a result, the above-described problem emerges.

Bisphenol A that is a dihydroxy compound used for conventional polycarbonates has a molecular weight of 228 and has a sufficiently high boiling point, but particularly, in the production method of the present invention, in view of effects, at least one dihydroxy compound out of dihydroxy compounds used for the reaction preferably has a boiling point at 5 kPa of 250° C. or less. The boiling point at 5 kPa is more preferably 240° C. or less, and the boiling point at 5 kPa is still more preferably 220° C. or less.

The dihydroxy compound is not particularly limited as long as it has a specific boiling point, but examples of the dihydroxy compound of a linear aliphatic hydrocarbon include ethylene glycol, 1,3-propanediol, 1,2-propanediol, 1,4-butanediol, 1,3-butanediol, 1,2-butanediol, 1,5-heptanediol, and 1,6-hexanediol.

Examples of the dihydroxy compound of a linearly branched aliphatic hydrocarbon include neopentyl glycol.

Examples of the dihydroxy compound of an alicyclic hydrocarbon include 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, and tricyclodecanedimethanol. Examples of the oxyalkylene glycols include diethylene glycol and triethylene glycol.

The average molecular weight of the dihydroxy compound used for the reaction is, in view of effects, preferably 220 or less, more preferably 200 or less, still more preferably 180 or less.

Here, the average molecular weight of the dihydroxy compound used for the reaction indicates a numerical value calculated by multiplying the molecular weight of each dihydroxy compound by the molar fraction based on all dihydroxy compounds and adding the obtained values.

<Later-Stage Reaction Step>

The oligomer obtained in the early-stage reaction step is fed to, for example, a horizontal stirring reactor and allowed to undergo a polycondensation reaction usually at a temperature of preferably from 200 to 280° C. to obtain a polycarbonate. This reaction is usually performed continuously by using preferably one or more reactor vessels, more preferably from 1 to 3 vessels.

The reaction temperature is preferably from 210 to 270° C., more preferably from 220 to 260° C. The pressure is usually, preferably from 13.3 kPa to 1.3 Pa, more preferably from 2 kPa to 3 Pa, still more preferably from 1 kPa to 10 Pa. The average residence time is usually, preferably from 0.1 to 10 hours, more preferably from 0.5 to 5 hours, still more preferably from 0.5 to 2 hours.

In the later-stage reaction step, respective reactors are preferably set to proceed stepwise to a higher temperature and a higher vacuum within the above-described reaction conditions so as to effectively remove byproduct phenol and the like to the outside of the system along with the progress of the polycondensation reaction. Incidentally, in order to prevent reduction in the quality such as color tone of the polycarbonate obtained, the reactor is preferably set to a low temperature and a short residence time as much as possible.

<Reactor>

In the case of performing a polycondensation step, it is usually preferred to provide a plurality of reactor vessels including a vertical stirring reactor and thereby increase the average molecular weight (reduced viscosity) of the polycarbonate.

Here, the reactor includes, for example, a vertical stirring reactor and a horizontal stirring reactor. Specific examples thereof include a stirring tank-type reactor, a thin-film reactor, a centrifugal thin-film evaporation reactor, a surface renewal-type twin-screw kneading reactor, a twin-screw horizontal stirring reactor, a wet wall-type reactor, a porous plate-type reactor allowing polymerization to proceed during a free fall, and a wire-attached porous plate-type reactor allowing polymerization to proceed during a fall along the wire.

The vertical stirring reactor has a vertical rotating shaft and a stirring blade attached to the vertical rotating shaft. Examples of the type of the stirring blade include a turbine blade, a paddle blade, a Pfaudler blade, an anchor blade, a FULLZONE blade [manufactured by Shinko Pantec Co., Ltd.], a SANMELLER blade [manufactured by Mitsubishi Heavy Industries, Ltd.], a MAXBLEND blade [manufactured by Sumitomo Heavy Industries, Ltd.], and a helical ribbon or twisting lattice blade [manufactured by Hitachi, Ltd.].

Also, the horizontal stirring reactor is a reactor having a stirring blade-rotating shaft laid horizontally (horizontal direction) and having mutually discontinuous stirring blades attached almost perpendicularly to the horizontal rotating shaft, and examples of the type of the stirring blade include a single shaft-type stirring blade such as disk and paddle, and a twine shaft-type stirring blade such as HVR, SCR, N—SCR [manufactured by Mitsubishi Heavy Industries, Ltd.], Bivolak [manufactured by Sumitomo Heavy Industries, Ltd.], and a spectacle-shaped or lattice blade [manufactured by Hitachi, Ltd.]. Assuming that the length of the horizontal rotating shaft of the horizontal reactor is L and the rotation diameter of the stirring blade is D, L/D is preferably from 1 to 15, more preferably from 2 to 14.

<One Example of Production Apparatus>

One example of the method of the present invention to which this embodiment is applied is specifically described below by using FIG. 1. The production apparatus, raw material and catalyst described below are merely an example of the embodiment of the present invention, and the present invention is not limited to these examples.

FIG. 1 is a view illustrating an example of the production apparatus for use in the method of the invention. In the production apparatus shown in FIG. 1, the polycarbonate of the present invention is produced through a raw material preparation step of preparing the above-described dihydroxy compound and a carbonic acid diester, which are raw materials, and a polycondensation step of causing these raw materials to undergo a polycondensation reaction in the molten state by using a plurality of reactors.

The liquid distillate produced in the polycondensation step is liquefied in condensers 12a, 12b, 12c and 12d and recovered in a liquid distillate recovery tank 14a. In the following, the production apparatus is described by referring, as an example, to a case of using ISB and 1,4-cyclohexanedimethanol (CHDM) as the raw material dihydroxy compound, using DPC as the raw material carbonic acid diester, and using calcium acetate as the catalyst.

After the polycondensation step, a polycarbonate pellet is formed through a step of devolatizing and removing an unreacted raw material and a reaction byproduct contained in the polymerization reaction solution (not shown), a step of adding a thermal stabilizer, a release agent, a colorant and the like (not shown), and a step of forming the polycarbonate into a pellet having a predetermined particle diameter (not shown).

First, in the raw material preparation step, a DPC melt prepared at a predetermined temperature in a nitrogen gas atmosphere is continuously fed to a raw material mixing tank 2a from a raw material feed port 1a. Also, an ISB melt and a CHDM melt each weighed in a nitrogen gas atmosphere are continuously fed to the raw material mixing tank 2a from raw material feed ports 1b and 1c, respectively. In the raw material mixing tank 2a, these materials are mixed to obtain a raw material mixture melt.

The obtained raw material mixture melt is continuously fed to a first vertical stirring reactor 6a through a raw material feed pump 4a and a raw material filter 5a. As the catalyst, an aqueous calcium acetate solution is continuously fed from a catalyst feed port 1d provided in the middle of a raw material mixture melt transferring pipe.

In the polycondensation step of the production apparatus shown in FIG. 1, a first vertical stirring reactor 6a, a second vertical stirring reactor 6b, a third vertical stirring reactor 6c, and a fourth horizontal stirring reactor 6d are provided in series. In each reactor, a polycondensation reaction is performed by keeping the liquid level constant, and the polymerization reaction solution discharged from the bottom of the first vertical stirring reactor 6a is continuously fed in sequence to the second vertical stirring reactor 6b, then to the third vertical stirring reactor 6c and further to the fourth horizontal stirring reactor 6d, thereby allowing a polycondensation reaction to proceed. The reaction conditions in respective reactors are preferably set to shift to a higher temperature, a higher vacuum and a lower stirring speed with the progress of the polycondensation reaction. In the case of using the apparatus of FIG. 1, the first vertical stirring reactor 6a corresponds to the first reactor in the present invention, and the second vertical stirring reactor 6b corresponds to the second reactor in the present invention.

The first vertical stirring reactor 6a, the second vertical stirring reactor 6b and the third vertical stirring reactor 6c are provided with MAXBLEND blades 7a, 7b and 7c, respectively. The fourth horizontal stirring reactor 6d is provided with a twin-shaft spectacle-shaped stirring blade 7d. After the third vertical stirring reactor 6c, the reaction solution on transfer has a high viscosity and therefore, a gear pump 4b is provided.

In the first vertical stirring reactor 6a and the second vertical stirring reactor 6b, the amount of heat supplied may become large in particular and in order to prevent the temperature of the heating medium from rising excessively, internal heat exchangers 8a and 8b are provided, respectively.

Incidentally, in these four reactor vessels, distillation tubes 11a, 11b, 11c and 11d for discharging a byproduct and the like generated by the polycondensation reaction are attached, respectively. In the first vertical stirring reactor 6a and the second vertical stirring reactor 6b, reflux condensers 9a and 9b and reflux tubes 10a and 10b are provided, respectively, so as to return a part of the liquid distillate to the reaction system. The reflux ratio can be controlled by appropriately adjusting each of the pressure of the reactor and the heating medium temperature of the reflux condenser, and the reflux ratio in the first reactor can be calculated from the distillate volume measured in the distillation tube 11a and the reflux amount measured in the reflux tube 10a. That is, the reflux ratio can be determined by the ratio of the reflux amount to the distillate volume.

The distillation tubes 11a, 11b, 11c and 11d are connected to condensers 12a, 12b, 12c, and 12d, respectively, and each reactor is kept in a predetermined decompressed state by a decompressor 13a, 13b, 13c or 13d.

In this embodiment, a byproduct such as phenol (monohydroxy compound) is continuously liquefied and recovered from the condensers 12a, 12b, 12c, and 12d attached to respective reactors. Also, a cold trap (not shown) is provided on the downstream side of the condensers 12c and 12d attached to the third vertical stirring reactor 6c and the fourth horizontal stirring reactor 6d, respectively, and a byproduct is continuously solidified and recovered.

<Start of Melt Polycondensation in Continuous Production Apparatus>

In this embodiment, the polycondensation based on the transesterification reaction of a dihydroxy compound and a carbonic acid diester is started according to the following procedure.

First, in the continuous production apparatus shown in FIG. 1, each of the four reactor vessels connected in series (first vertical stirring reactor 6a, second vertical stirring reactor 6b, third vertical stirring reactor 6c, and fourth horizontal stirring reactor 6d) is previously set to a predetermined internal temperature and a predetermined pressure. Here, the internal temperature of each reactor, the heating medium temperature and the pressure are not particularly limited but are preferably set as follows.

(First Vertical Stirring Reactor 6a)
Internal temperature: from 150 to 250° C., pressure: from 80 to 5 kPa, heating medium temperature: from 150 to 265° C., reflux ratio: from 0.01 to 10.

(Second Vertical Stirring Reactor 6b)
Internal temperature: from 160 to 250° C., pressure: from 40 to 8 kPa, heating medium temperature: from 170 to 280° C., reflux ratio: from 0.01 to 5.

(Third Vertical Stirring Reactor 6c)
Internal temperature: from 190 to 260° C., pressure: from 10 to 1.3 kPa, heating medium temperature: from 190 to 280° C.

(Fourth Horizontal Stirring Reactor 6d)
Internal temperature: from 210 to 270° C., pressure: from 1 kPa to 1 Pa, heating medium temperature: from 210 to 280° C.

Next, separately, in the raw material mixing tank 2a, the above-described dihydroxy compound and a carbonic acid diester are mixed in a predetermined molar ratio in a nitrogen gas atmosphere to obtain a raw material mixture melt.

Subsequently, after the internal temperature and pressure of each of those four reactors have reached values within the range of ±5% of respective set values, the raw material mixture melt separately prepared in the raw material mixing tank 2a is continuously fed to the first vertical stirring reactor 6a. Simultaneously with the start of feeding of the raw material mixture melt, a catalyst is continuously fed to the first vertical stirring reactor 6a from the catalyst feed port 1d to start a transesterification reaction.

In the first vertical stirring reactor 6a where a transesterification reaction is performed, the liquid level of the polymerization reaction solution is kept constant so as to ensure a predetermined average residence time. The method for keeping the liquid level in the first vertical stirring reactor 6a constant includes a method of controlling the degree of opening of a valve (not shown) disposed in a polymer discharge line at the bottom while detecting the liquid level usually by a level gauge or the like.

Here, the average residence time in the first vertical stirring reactor 6a is not particularly limited but usually, preferably from 30 to 120 minutes.

Subsequently, the polymerization reaction solution is, in a continuous and sequential manner, discharged from the bottom of the first vertical stirring reactor 6a, fed to the second vertical stirring reactor 6b, then discharged from the bottom of the second vertical stirring reactor 6b, and fed to the third vertical stirring reactor 6c. In this early-stage reaction step, the byproduct phenol is distilled off in a ratio of 50 to 95% based on the theoretical amount, and an oligomer is produced.

Thereafter, the oligomer obtained in the early-stage reaction step is transferred by the gear pump 4b and fed to the fourth horizontal stirring reactor 6d having a horizontal rotating shaft and mutually discontinuous stirring blades attached almost perpendicularly to the horizontal rotating shaft, in which assuming that the length of the horizontal rotating shaft is L and the rotation diameter of the stirring blade is D, L/D is from 1 to 15, and under the temperature and pressure conditions suitable for performing a later-stage reaction described below, a byproduct phenol and a part of an unreacted monomer are removed to the outside of the system through the distillation tube 11d, whereby a polycarbonate is produced.

The fourth horizontal stirring reactor 6d is a horizontal high-viscosity liquid processing unit having one horizontal rotating shaft or two or more horizontal rotating shafts, where stirring blades such as disk type, wheel type, paddle type, bar type and window frame type are disposed individually or in combination of two or more on the horizontal rotating shaft in at least two or more stages per rotating shaft and surface renewal of the reaction solution is effected by stirring or spreading the reaction solution with the stirring blade.

Incidentally, the term "surface renewal of the reaction solution" as used in this description means that the reaction solution on the liquid surface is replaced by the reaction solution below the liquid surface.

In this way, the horizontal stirring reactor for use in the present invention is a unit having a horizontal shaft and mutually discontinuous stirring blades attached almost perpendicularly to the horizontal shaft and does not have a screw portion unlike an extruder. In the method of the present invention, it is preferred to use at least one vessel of such a horizontal stirring reactor.

The reaction temperature in the later-stage reaction step is usually, preferably from 200 to 280° C., more preferably from 210 to 260° C. The reaction pressure in the later-stage reaction step is usually, preferably from 13.3 kPa to 1.3 Pa, more preferably from 2 kPa to 3 Pa, still more preferably from 1 kPa to 10 Pa.

In the method of the present invention, the horizontal stirring reactor $6d$ used is a reactor giving a large holdup volume in view of unit structure as compared with a twin-screw vented extruder, and this makes it possible not only to appropriately set the residence time of the reaction solution but also to lower the temperature thanks to suppression of shear heat generation, whereby a polycarbonate with a more improved color tone and excellent mechanical properties can be obtained.

In the reaction unit for use in the present invention, from the standpoint of color tone of the polycarbonate, the surface material of a component part such as device or pipe constituting the reaction unit, in a portion coming into contact with a raw material monomer or a polymerization solution (hereinafter referred to as "liquid-contact portions"), is preferably composed of one member or two or more members of stainless steel having a nickel content of 10 wt % or more, glass, nickel, tantalum, chromium and Teflon (registered trademark), in a ratio of at least 90% or more of the total surface area of the liquid-contact part.

In the present invention, it is sufficient if the surface material in the liquid-contact portion is composed of the above-described substance, and a laminate of the above-described substance and another substance or a material obtained by plating another substance with the above-described substance can be used as the surface material.

The byproduct phenol generated simultaneously with the melt polycondensation reaction in each reactor is distilled off to the outside of the system through a distillation tube ($11a$, $11b$, $11c$, $11d$) attached to each reactor.

As described above, in this embodiment, in the continuous production apparatus shown in FIG. 1, after the internal temperature and pressure of each of four reactor vessels have reached predetermined values, a raw material mixture melt and a catalyst are continuously fed through a preheater, and melt polycondensation based on a transesterification reaction is started.

Therefore, the average residence time of the polymerization reaction solution in each reactor becomes equal to that in stationary operation immediately after the start of melt polycondensation. As a result, the polymerization reaction solution is not subject to a higher heat history than necessary, and an extraneous material such as gel and burn deposit produced in the obtained polycarbonate is reduced. The color tone is also improved.

After the polycondensation reaction described above, the polycarbonate of the present invention is usually solidified by cooling and pelletized by means of a rotary cutter or the like. The method for pelletization is not limited, but examples thereof include: a method where the polycarbonate in the molten state is withdrawn out of the final polymerization reactor, solidified by cooling in a strand form and pelletized; a method where the resin in the molten state is fed to a single-screw or twin-screw extruder from the final polymerization reactor, melt-extruded, then solidified by cooling and pelletized; and a method where the resin in the molten state is withdrawn from the final polymerization reactor, solidified by cooling in a strand form and once pelletized and thereafter, the resin is again fed to a single-screw or twin-screw extruder, melt-extruded, then solidified by cooling and pelletized.

In the extruder, the residual monomer may be devolatized under reduced pressure, or commonly known additives such as thermal stabilizer, neutralizer, ultraviolet absorber, release agent, colorant, antistatic agent, slip agent, lubricant, plasticizer, compatibilizer and flame retardant may be added and knead.

The melt kneading temperature in the extruder is dependent on the glass transition temperature or molecular weight of the polycarbonate but is usually, preferably from 150 to 300° C., more preferably from 200 to 270° C., still more preferably from 230 to 260° C. When the melt kneading temperature is 150° C. or more, the melt viscosity of the polycarbonate is kept low and prevented from becoming a great load on the extruder, and the productivity can be enhanced. Also, when the melt kneading temperature is 300° C. or less, the polycarbonate can be kept from thermal deterioration, and reduction in the mechanical strength due to decrease in the molecular weight, coloration and gas evolution can be prevented.

In the case of producing the polycarbonate of the present invention by using, as the carbonic acid diester, diphenyl carbonate or a substituted diphenyl carbonate such as ditolyl carbonate, phenol or a substituted phenol is generated as a byproduct and unavoidably remains in the polycarbonate, but the phenol or substituted phenol may give rise to an odor during molding.

After a normal reaction, the polycarbonate contains 1,000 ppm by weight or more of an aromatic ring-containing monohydroxy compound such as byproduct phenol, but from the standpoint of decreasing the odor, the content of this monohydroxy compound is preferably reduced to 700 ppm by weight or less, more preferably to 500 ppm by weight or less, still more preferably to 300 ppm by weight or less, by using a horizontal reactor excellent in devolatization performance or an extruder with a vacuum vent. However, it is difficult in industry to completely remove the monohydroxy compound above, and the lower limit of the content of the compound is usually 1 ppm by weight.

Such a monohydroxy compound may have a substituent depending on the raw material used and, for example, may have an alkyl group having a carbon number of 5 or less.

At the production of the polycarbonate of the present invention, a filter is preferably disposed so as to prevent inclusion of an extraneous material. The position where the filter is disposed is preferably on the downstream side of the extruder, and the size (opening size) of the filter to remove an extraneous material is preferably 100 μm or less in terms of 99% removal filtration accuracy. Above all, in the case of avoiding inclusion of a fine extraneous material in usage such as film, the size of the filter is preferably 40 μm or less, more preferably 20 μm or less.

In order to prevent inclusion of an extraneous material after extrusion, it is preferred to perform the extrusion of the polycarbonate of the present invention in a clean room having a cleanliness as defined in JIS B9920 (2002) of preferably higher than class 7, more preferably higher than class 6.

At the time of cooling and chipping the extruded polycarbonate, a cooling method such as air cooling or water cooling is preferably used. As for the air used in air cooling, an air after removing an extraneous material in air in advance through a hepafilter or the like is preferably used to prevent reattachment of an extraneous material in air. In the case of using water cooling, water after removing a metallic matter in water by means of an ion exchange resin or the like and further removing an extraneous material in water through a filter is preferably used. The opening of the filter used is preferably from 10 to 0.45 μm in terms of 99% removal filtration accuracy.

The molecular weight of the thus-obtained polycarbonate of the present invention can be expressed in the reduced viscosity, and the reduced viscosity is usually, preferably 0.20 dL/g or more, preferably 0.30 dL/g or more, and on the other hand, usually, preferably 1.20 dL/g or less, more preferably 1.00 dL/g or less, still more preferably 0.80 dL/g or less. If the reduced viscosity of the polycarbonate is too low, the mechanical strength of the molded article may decrease, whereas if the reduced viscosity is too high, flowability during molding tends to deteriorate, reducing the productivity or moldability. Incidentally, as for the reduced viscosity, a solution having a polycarbonate concentration precisely adjusted to 0.6 g/dL is prepared by using methylene chloride as the solvent and measured by means of an Ubbelohde viscometer at a temperature of 20.0° C.±0.1° C.

The polycarbonate of the present invention can be formed into a molded article by a commonly known method such as injection molding method, extrusion molding method or compression molding method. The molding method of the polycarbonate is not particularly limited, but an appropriate molding method is selected according to the shape of the molded article. In the case where the molded article has a film or sheet form, an extrusion molding method is preferred, and in the injection molding method, a degree of freedom of the molded article is obtained.

In the polycarbonate of the present invention, before performing various moldings, if desired, additives such as thermal stabilizer, neutralizer, ultraviolet absorber, release agent, colorant, antistatic agent, slip agent, lubricant, plasticizer, compatibilizer and flame retardant can be mixed by a tumbler, a supermixer, a floater, a V-blender, a Nauta mixer, a Banbury mixer or an extruder.

The polycarbonate of the present invention may be also used as a polymer alloy by kneading it with, for example, one member or two or more members of a synthetic resin such as aromatic polycarbonate, aromatic polyester, aliphatic polyester, polyamide, polystyrene, polyolefin, acryl, amorphous polyolefin, ABS and AS, a biodegradable resin such as polylactic acid and polybutylene succinate, and rubber.

<Raw Material and Catalyst>

The raw material and catalyst which can be used for the polycarbonate of the present invention are described below.

(Dihydroxy Compound)

The dihydroxy compound for use in the production of the polycarbonate of the present invention has a portion represented by the following formula (1):

[Chem. 4]

(1)

However, a case where the portion represented by formula (1) is a portion constituting a part of —CH$_2$—OH is excluded.

Specific examples of the dihydroxy compound having a portion represented by formula (1) in a part of the structure include oxyalkylene glycols, dihydroxy compounds having, in the main chain, an ether group bonded to an aromatic group, and dihydroxy compounds having a cyclic ether structure.

Examples of the oxyalkylene glycols include diethylene glycol, triethylene glycol, tetraethylene glycol, polyethylene glycol, and polypropylene glycol.

Examples of the dihydroxy compound having, in the main chain, an ether group bonded to an aromatic group include 2,2-bis[4-(2-hydroxyethoxy)phenyl]propane, 2,2-bis[4-(2-hydroxypropoxy)phenyl]propane, 1,3-bis(2-hydroxyethoxy)benzene, 4,4'-bis(2-hydroxyethoxy)biphenyl, and bis[4-(2-hydroxyethoxy)phenyl]sulfone.

Examples of the dihydroxy compound having a cyclic ether structure include a dihydroxy compound represented by the following formula (2) and a spiroglycol represented by the following formula (3) or (4).

Among these, in view of easy availability, handling, polymerization reactivity and color hue of the polycarbonate obtained, a dihydroxy compound having a cyclic ether structure is preferred, a dihydroxy compound represented by the following formula (2) and a dihydroxy compound having two cyclic ether structures, such as spiroglycol represented by the following formula (3), are more preferred, and an anhydrous sugar alcohol that is a dihydroxy compound having two sugar-derived cyclic ether structures, such as dihydroxy compound represented by formula (2), is still more preferred.

Among these dihydroxy compounds, use of a dihydroxy compound having no aromatic ring structure is preferred in view of light resistance of the polycarbonate, and among others, an anhydrous sugar alcohol such as dihydroxy compound represented by the following formula (2), which is obtained by dehydration condensation of sorbitol produced from various starches existing abundantly as a plant-derived resource and being easily available, is most preferred from the aspect of availability, ease of production, light resistance, optical properties, moldability, heat resistance and carbon neutral.

One of these compounds may be used alone, or two or more thereof may be used in combination, according to the performance required of the polycarbonate.

Incidentally, the "cyclic ether structure" of the "dihydroxy compound having a cyclic ether structure" means that the compound is composed of a structure having an ether group in a cyclic structure, where the carbon constituting the cyclic chain is an aliphatic carbon.

[Chem. 5]

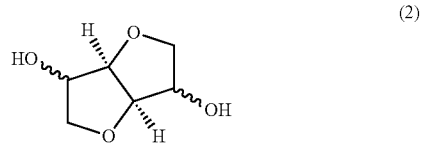

(2)

[Chem. 6]

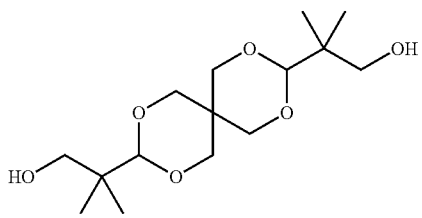

(3)

[Chem. 7]

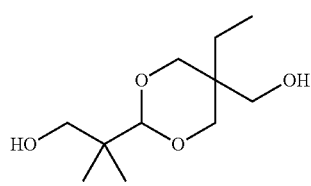

(4)

Examples of the dihydroxy compound represented by formula (2) include isosorbide (ISB), isomannide, and isoidide, which are stereoisomers. One of these compounds may be used alone, or two or more thereof may be used in combination.

The polycarbonate of the present invention may contain a structural unit derived from a dihydroxy compound other than the above-described dihydroxy compound (hereinafter, sometimes referred to as "the other dihydroxy compound"). Examples of the other dihydroxy compound include a dihydroxy compound of a linear aliphatic hydrocarbon, a dihydroxy compound of a linearly branched aliphatic hydrocarbon, a dihydroxy compound of an alicyclic hydrocarbon, and aromatic bisphenols.

Examples of the dihydroxy compound of a linear aliphatic hydrocarbon include ethylene glycol, 1,3-propanediol, 1,2-propanediol, 1,4-butanediol, 1,3-butanediol, 1,2-butanediol, 1,5-heptanediol, 1,6-hexanediol, 1,10-decanediol, and 1,12-dodecanediol.

Examples of the dihydroxy compound of a linearly branched aliphatic hydrocarbon include neopentyl glycol and hexylene glycol.

Examples of the dihydroxy compound of an alicyclic hydrocarbon include 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol, 1,3-adamantanedimethanol, and a dihydroxy compound derived from a terpene compound such as limonene.

Examples of the aromatic bisphenols include 2,2-bis(4-hydroxyphenyl)propane, 2,2-bis(4-hydroxy-3,5-dimethylphenyl)propane, 2,2-bis(4-hydroxy-3,5-diethylphenyl) propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, 4,4'-dihydroxydiphenyl ether, and 4,4'-dihydroxy-3,3'-dichlorodiphenyl ether.

One of these may be used alone, or two or more thereof may be used in combination, according to the performance required of the polycarbonate. Among others, in view of light resistance of the polycarbonate, dihydroxy compounds having no aromatic ring structure in the molecular structure, that is, a dihydroxy compound of an aliphatic hydrocarbon and a dihydroxy compound of an alicyclic hydrocarbon, are preferred, and these compounds may be also used in combination.

The dihydroxy compound of an aliphatic hydrocarbon is preferably, among others, a dihydroxy compound of a linear aliphatic hydrocarbon having a carbon number of 3 to 6 and having a hydroxy group at both terminals, such as 1,3-propanediol, 1,4-butanediol, 1,5-heptanediol and 1,6-hexanediol. The dihydroxy compound of an alicyclic hydrocarbon is preferably, among others, 1,2-cyclohexanedimethanol, 1,3-cyclohexanedimethanol, 1,4-cyclohexanedimethanol or tricyclodecanedimethanol, more preferably a dihydroxy compound having a cyclohexane structure such as 1,2-cyclohexanedimethanol, 1,3-cyclohexanedimethanol and 1,4-cyclohexanedimethanol, and most preferably 1,4-cyclohexanedimethanol.

By using the other dihydroxy compound, an effect such as improved flexibility of the polycarbonate, enhanced heat resistance and improved moldability may be obtained, but if the content of the structural unit derived from the other dihydroxy compound accounts for a too large proportion, reduction in the mechanical properties or reduction in the heat resistance may be incurred. Accordingly, the ratio of the structural unit derived from the dihydroxy compound having a portion represented by formula (1) to the number of moles of the structural units derived from all dihydroxy compounds is preferably 90 mol % or less, more preferably 85 mol % or less, still more preferably 80 mol % or less, and on the other hand, preferably 20 mol % or more, more preferably 30 mol % or more, still more preferably 40 mol % or more.

The dihydroxy compound of the present invention may contain a stabilizer such as reducing agent, antioxidant, deoxidizer, light stabilizer, antacid, pH stabilizer and heat stabilizer. In particular, the dihydroxy compound for use in the present invention is susceptible to degradation under acidic conditions and therefore, it is preferred to contain a basic stabilizer.

Examples of the basic stabilizer include hydroxides, carbonates, phosphates, phosphites, hypophosphites, borates and fatty acid salts of metals belonging to Group 1 or Group 2 of the long form periodic table (Nomenclature of Inorganic Chemistry IUPAC Recommendations 2005) and further include a basic ammonium compound such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide; an amine-based compound such as diethylamine, dibutylamine, triethylamine, morpholine, N-methylmorpholine, pyrrolidine, piperidine, 3-amino-1-propanol, ethylenediamine, N-methyldiethanolamine, diethylethanolamine, 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline; and a hindered amine-based compound such as di-(tert-butyl) amine and 2,2,6,6-tetramethylpiperidine. Among stabilizers, in view of the stabilization effect, a phosphate of sodium or potassium, morpholine, and di-tert-butylamine are preferred.

The content of the basic stabilizer in the dihydroxy compound of the present invention is not particularly limited, but the dihydroxy compound of the present invention is unstable in the acidic state and therefore, the stabilizer is preferably added such that an aqueous solution of the dihydroxy compound, containing the stabilizer, has a pH of 7 or more. If the content is too small, the effect of preventing degradation of the dihydroxy compound of the present invention may not be obtained, whereas if the content is too large, alteration of the dihydroxy compound may be incurred. For these reasons, the content is usually, preferably from 0.0001 to 1 wt %, more preferably from 0.001 to 0.1 wt %, based on the dihydroxy compound of the present invention.

If the dihydroxy compound of the present invention containing the basic stabilizer is used as a raw material for polycarbonate production, not only the basic stabilizer itself serves as a polymerization catalyst to make it difficult to control the polymerization rate or quality but also the color hue of the resin is impaired. Therefore, before using the dihydroxy compound as a raw material for polycarbonate production, the basic stabilizer is preferably removed by an ion exchange resin, distillation or the like.

The dihydroxy compound for use in the present invention is likely to be gradually oxidized by oxygen, and therefore, the compound during storage, production or handling is preferably prevented from decomposition due to oxygen by allowing for no mingling of water, using an deoxidizer or creating a nitrogen atmosphere.

When isosorbide is oxidized, a decomposition product including formic acid is generated. For example, if a polycarbonate is produced using isosorbide containing such a decomposition product, the decomposition product not only causes coloration of the obtained polycarbonate or significant deterioration of the physical properties but also may affect the polymerization reaction and make it impossible to obtain a polymer having a high molecular weight.

In order to obtain the dihydroxy compound for use in the present invention containing no oxidative decomposition product and remove the basic stabilizer, distillative purification is preferably performed. The distillation here may be simple distillation or continuous distillation and is not particularly limited. As to the distillation conditions, distillation is preferably performed under reduced pressure in an inert gas atmosphere such as argon or nitrogen and for inhibiting thermal alteration, is preferably performed under the condition of 250° C. or less, more preferably 200° C. or less, still more preferably 180° C. or less. Thanks to such distillative purification, when a dihydroxy compound containing the above-described dihydroxy compound of the present invention is used as a raw material for polycarbonate production, a polycarbonate excellent in the color hue and thermal stability can be produced without impairing the polymerization reactivity.
(Carbonic Acid Diester)

The polycarbonate of the present invention can be obtained by using a dihydroxy compound containing the dihydroxy compound of the present invention and a carbonic acid diester as raw materials and subjecting the raw materials to polycondensation by a transesterification reaction.

The carbonic acid diester used includes usually a carbonic acid diester represented by the following formula (5). One of these carbonic acid diesters may be used alone, or two or more thereof may be mixed and used.

[Chem. 8]

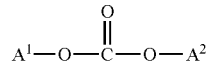

(5)

In formula (5), each of $A^1$ and $A^2$ is a substituted or unsubstituted aliphatic hydrocarbon group having a carbon number of 1 to 18 or an substituted or unsubstituted aromatic hydrocarbon group, and $A^1$ and $A^2$ may be the same or different. Each of $A^1$ and $A^2$ is preferably a substituted or unsubstituted aromatic hydrocarbon group, more preferably an unsubstituted aromatic hydrocarbon group.

Examples of the carbonic acid diester represented by formula (5) include diphenyl carbonate (DPC), a substituted diphenyl carbonate such as ditolyl carbonate, dimethyl carbonate, diethyl carbonate, and di-tert-butyl carbonate. Among these, diphenyl carbonate and a substituted diphenyl carbonate are preferred, and diphenyl carbonate is more preferred.

Incidentally, the carbonic acid diester sometimes contains impurities such as chloride ion, and the impurities may inhibit the polymerization reaction or worsen the color hue of the polycarbonate obtained. Therefore, a carbonic acid diester purified by distillation or the like is preferably used, as needed.
(Transesterification Reaction Catalyst)

The polycarbonate of the present invention is produced, as described above, by a transesterification reaction of a dihydroxy compound containing the dihydroxy compound of the present invention and a carbonic acid diester represented by formula (5). In more detail, the polycarbonate is obtained by removing, for example, a byproduct monohydroxy compound generated in the transesterification reaction to the outside of the system. In this case, polycondensation is usually performed by a transesterification reaction in the presence of a transesterification reaction catalyst.

The transesterification reaction catalyst which can be used at the production of the polycarbonate of the present invention affects the reaction rate or the color tone of the polycarbonate.

The catalyst used is not limited so long as the transparency, color hue, heat resistance, thermal stability and mechanical strength of the polycarbonate produced can be satisfied, but examples thereof include a metal compound belonging to Group 1 or Group 2 of the long form periodic table (hereinafter, simply referred to as "Group 1" or "Group 2"), and a basic compound such as basic boron compound, basic phosphorus compound, basic ammonium compound and amine-based compound. A Group 1 metal compound and/or a Group 2 metal compound are preferably used.

A basic compound such as basic boron compound, basic phosphorus compound, basic ammonium compound and amine-based compound may be secondarily used in combination together with a Group 1 metal compound and/or a Group 2 metal compound, but it is particularly preferred to use only a Group 1 metal compound and/or a Group 2 metal compound.

As for the form of the Group 1 metal compound and/or Group 2 metal compound, the compound is used usually in the form of a hydroxide or a salt such as carbonate, carboxylate and phenoxide, but in view of availability and handleability, a hydroxide, a carbonate and an acetate are preferred, and in view of color hue or polymerization activity, an acetate is preferred.

Examples of the Group 1 metal compound include sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, phenylated boron sodium, phenylated boron potassium, phenylated boron lithium, phenylated boron cesium, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, an alcoholate or phenolate of sodium, potassium, lithium and cesium, and disodium, dipotassium, dilithium and dicesium salts of bisphenol A. Among these, a lithium compound is preferred.

Examples of the Group 2 metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Among these, a magnesium compound, a calcium compound and a barium compound are preferred, and in view of polymerization activity and color hue of the polycarbonate obtained, a magnesium compound and/or a calcium compound are more preferred, with a calcium compound being most preferred.

Examples of the basic boron compound include sodium, potassium, lithium, calcium, barium, magnesium and strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron and butyltriphenylboron.

Examples of the basic phosphorus compound include triethylphosphine, tri-n-propylphosphine, triisopropylphosphine, tri-n-butylphosphine, triphenylphosphine, tributylphosphine, and a quaternary phosphonium salt.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenyl ammonium hydroxide, benzyltriphenylammonium hydroxide, methyltriphenylammonium hydroxide, and butyltriphenylammonium hydroxide.

Examples of the amine-based compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, aminoquinoline, and guanidine.

The amount of the polymerization catalyst used is usually, preferably from 0.1 to 300 μmol, more preferably from 0.5 to 100 μmol, per mole of all dihydroxy compounds used for the polymerization. Above all, in the case of using a compound containing at least one metal selected from the group consisting of lithium and a Group 2 metal of the long-form periodic table, particularly, in the case of using a magnesium compound and/or a calcium compound, the amount of the catalyst used is usually, in terms of the metal amount, preferably 0.1 μmol or more, more preferably 0.3 μmol or more, still more preferably 0.5 μmol or more, and usually, preferably 20 μmol or less, more preferably 10 μmol or less, still more preferably 3 μmol or less, yet still more preferably 1.5 μmol or less, per mole of all dihydroxy compounds.

If the amount of the catalyst is too small, the polymerization rate becomes low and when it is intended to obtain a polycarbonate having a desired molecular weight, the polymerization temperature must be raised, as a result, the color hue of the polycarbonate obtained may be worsened, or due to volatilization of an unreacted raw material during polymerization, the molar ratio between a dihydroxy compound and a carbonic acid diester may be unbalanced, failing in reaching the desired molecular weight might. On the other hand, if the amount of the polymerization catalyst used is too large, an undesirable side reaction may occur in combination to worsen the color hue of the polycarbonate obtained or cause coloration of the resin during molding.

Also, if a Group 1 metal, among others, sodium, potassium or cesium, is contained in the polycarbonate in a large amount, such a metal may adversely affect the color hue, and the metal may emerge not only from the catalyst used but also from the raw material or the reaction apparatus. For this reason, the total amount of these compounds in the polycarbonate is usually, in terms of the metal amount, preferably 2 μmol or less, more preferably 1 μmol or less, still more preferably 0.5 μmol or less, per mol of all dihydroxy compounds.

EXAMPLES

The present invention is described in greater detail below by referring to Examples, but the present invention is not limited to these Examples as long as the purport thereof is observed.

In the following, the compositional analysis and evaluations of physical properties of each of the reaction solution, the liquid distillate and the polycarbonate were performed by the methods described below.

1) Phenol Content in Reaction Solution

About 0.5 g of the sample was precisely weighed and dissolved in 5 ml of methylene chloride, and acetone was added thereto to make a total amount of 25 ml. This solution was filtered through a 0.2 μm disk filter and after quantitatively determining phenol by liquid chromatography, the content was calculated.

The apparatus and conditions used are as follows.

Apparatus:
  manufactured by Shimadzu Corp.
  System controller: CBM-20A
  Pump: LC-10AD
  Column oven: CTO-10ASvp
  Detector: SPD-M20A
  Analysis column: Cadenza CD-18, 4.6 mmϕ×250 mm
  Oven temperature: 40° C.
Detector wavelength: 260 nm Eluent:
Solution A: an aqueous 0.1% phosphoric acid solution; Solution B: acetonitrile; a 10 minutes gradient from A/B=40/60 (vol %) to A/B=0/100 (vol %)
Sample injection amount: 10 μl 2) Content of Dihydroxy Compound in Each of Reaction Solution and Liquid Distillate A predetermined amount of undecane was dissolved in 250 mL of acetonitrile, and the resulting solution was used as the internal standard solution. About 1 g of the sample was precisely weighed, and 10 mL of the internal standard solution was added thereto by a hole pipette and dissolved. This solution was filtered through a 0.2 μm disk filter and after quantitatively determining the dihydroxy compound by gas chromatography, the content of the dihydroxy compound was calculated.

The apparatus and conditions used are as follows.
Apparatus:
6850, manufactured by Agilent Technologies
Column:
DB-1, manufactured by Agilent Technologies (internal diameter: 250 μm, length: 30 m, film pressure: 0.25 μm)
Oven temperature:
kept at 50° C. for 3 minutes→temperature rise at 10° C./min→250° C.→temperature rise at 50° C./min→kept at 300° C. for 6 minutes
Detector: hydrogen flame ionization detector
Inlet temperature: 250° C.
Detector temperature: 320° C.
Carrier gas: helium
Sample injection amount: 1 μl 3) Measurement of Ratio of Structural Units Derived from Respective Dihydroxy Compounds in Polycarbonate As for the ratio of structural units of respective dihydroxy compounds in the polycarbonate, 30 mg of polycarbonate was weighed out and dissolved in about 0.7 mL of deuterochloroform, and the resulting solution was put in a tube for NMR having an internal diameter of 5 mm and measured for the $^1$H NMR spectrum. Using the ratio of signal intensities based on structural units derived from respective dihydroxy compounds, the ratio of structural ratios derived from respective dihydroxy compounds was determined.

The apparatus and conditions used are as follows.
Apparatus:
JNM-AL400, manufactured by JEOL Ltd. (resonant frequency: 400 MHz)
Measurement temperature: ordinary temperature
Relaxation time: 6 seconds
Number of integrations: 128

4) Reduced Viscosity

A polycarbonate solution having a concentration of 0.6 g/dL was prepared using methylene chloride as the solvent and measured at a temperature of 20.0° C.±0.1° C. by using an Ubbelohde viscometer manufactured by Moritomo Rika Kogyo, and from the flow-down time $t_0$ of the solvent and the flow-down time t of the solution, the relative viscosity $\eta_{rel}$ was determined according to the following formula:

$$\eta_{rel}=t/t_0$$

The specific viscosity $\eta_{sp}$ was determined from the relative viscosity according to the following formula:

$$\eta_{sp}=(\eta-\eta_0)/\eta_0=\eta_{rel}-1$$

The reduced viscosity $\eta_{sp}/c$ was determined by dividing the specific viscosity by the concentration c (g/dL). A larger value indicates a higher the molecular weight.

5) Pellet YI Value of Polycarbonate

The color hue of the polycarbonate was evaluated in accordance with ASTM D1925 by measuring the YI value (Yellow Index value) in the reflected light from the pellet. As for the apparatus, a spectrophotometer, CM-5, manufactured by Konica Minolta Optics, Inc. was used, and as for the measurement conditions, a measurement diameter of 30 mm and SCE were selected.

A calibration glass CM-A212 for petri dish measurement was set in the measurement part, zero calibration was performed by superposing a zero calibration box CM-A124 thereon, and subsequently, white calibration was performed using a built-in white calibration plate. The measurement was performed using a white calibration plate CM-A210, and it was confirmed that L* was 99.40±0.05, a* was 0.03±0.01, b* is −0.43±0.01, and YI was −0.58±0.01.

The measurement of the pellet was performed by filling a cylindrical glass vessel having an internal diameter of 30 mm and a height of 50 mm with pellets to a depth of about 40 mm. An operation of taking out the pellets from the glass vessel and again performing the measurement was repeated two times, and an average value of three measurements in total was used. A smaller YI value means that the yellow tint of the resin is lessened and the color tone is better.

Abbreviations of the compounds used in the following Examples are as follows.
ISB: Isosorbide (trade name: POLYSORB, produced by Roquette Freres)
CHDM: 1,4-Cyclohexanedimethanol [trade name: SKY CHDM, produced by New Japan Chemical Co., Ltd.]
DPC: Diphenyl carbonate [produced by Mitsubishi Chemical Corp.]

Example 1

A polycarbonate was produced under the following conditions by using a continuous production apparatus having, as shown in FIG. 1, three vertical stirring reactor vessels and one horizontal stirring reactor vessel. Incidentally, a reflux condenser is attached to each of the first reactor and the second reactor, and the internal volume of the first reactor was 230 L.

Each reactor was set to the temperature•pressure shown in Table 1. Separately, in the raw material preparation step, ISB, CHDM and DPC were mixed in a fixed molar ratio (ISB/CHDM/DPC=0.500/0.500/0.995) in a nitrogen atmosphere and heated at 120° C. to obtain a raw material mixture melt.

Subsequently, the raw material mixture melt was continuously fed into the first vertical stirring reactor 6a controlled to the range of ±5% of the predetermined temperature•pressure through a raw material introduction tube heated at 140° C., and while controlling the degree of opening of a valve (not shown) disposed in a polymer discharge line at the bottom such that the average residence time became 80 minutes, the liquid level was kept constant.

Simultaneously with the start of feeding of the raw material mixture melt, an aqueous calcium acetate solution as the catalyst was continuously fed into the first vertical stirring reactor 6a from the catalyst feed port 1d at a ratio of 1.5 μmol per mol of all dihydroxy components.

Subsequently, the polymerization reaction solution discharged from the bottom of the first vertical stirring reactor 6a was continuously and sequentially fed to the second vertical stirring reactor 6b, to the third vertical stirring reactor 6c, and the fourth horizontal stirring reactor 6d (twin-shaft spectacle-shaped blade, L/D=4).

During the polymerization reaction, the liquid level of each reactor was controlled to give the average residence time shown in Table 1, and the byproduct phenol generated simultaneously with the polymerization reaction was removed by distillation. The reflux ratio was set to 1.3 by adjusting the temperature of the reflux condenser of the first vertical stirring reactor.

After operation under the above-described reaction conditions for 24 hours, the distillation percentage from the first vertical stirring reactor measured by a flowmeter attached to the distillation tube 11a was 68%. The liquid distillate and the reaction solution were sampled from valves attached to the outlet of the reflux condenser and at the outlet of the first vertical stirring reactor and subjected to compositional analysis, as a result, the dihydroxy compound content in the liquid distillate was less than 0.1 wt %, the phenol content in the reaction solution was 9.6 wt %, and the dihydroxy compound content in the reaction solution was 1.0 wt %. The internal temperature of the first reactor was from 194 to 196° C., and the internal pressure of the first reactor was from 25 to 27 kPa. Incidentally, the temperature of the heating medium of the first vertical stirring reactor was 217° C.

The reduced viscosity of the polycarbonate obtained in this way from the fourth horizontal stirring reactor was 0.645, the pellet YI value was 9.7, and the molar ratio of dihydroxy compound structural units of the polycarbonate was ISB/CHDM=50.1/49.9 and remained the same as in the charge composition.

When compositional analysis of liquid distillates coming out of all reactors was performed, the dihydroxy compound content was 0.2 wt %. These results are shown together in Table 2.

Example 2

Production was performed in the same manner as in Example 1 except for setting the reflux ratio to 7.5 by adjusting the temperature of the reflux condenser of the first vertical stirring reactor. Because the internal temperature of the first vertical stirring reactor was reduced to be lower than the predetermined temperature, the temperature of the heating medium was raised, but the internal temperature showed a rise only to 185° C. and therefore, the operation was performed under this reaction condition.

The pellet YI value of the obtained polycarbonate was 15.6, and the color tone was worse than that in Example 1. The results are shown in Table 2.

Example 3

Production was performed in the same manner as in Example 1 except for setting the reflux ratio to 0.1 by adjusting the temperature of the reflux condenser of the first vertical stirring reactor. The distillate volume of the dihydroxy compound was equal to that in Example 1, nevertheless, the temperature of the heating medium of the first vertical stirring reactor could be lowered, and the color tone of the obtained polycarbonate was enhanced. The results are shown in Table 2.

Comparative Example 1

Production was performed in the same manner as in Example 1 except for setting the pressure to normal pressure and not performing reflux in the first stirring reactor (entire distillation). The distillation percentage from the first vertical stirring reactor was 5%, and the dihydroxy compound content in the reaction solution was 18.0 wt %, revealing that the reaction less proceeds than in Example 1.

The pellet YI value of the obtained polycarbonate was 20.5, and the color tone was worse than that in Example 1. The results are shown in Table 2.

Comparative Example 2

Production was performed in the same manner as in Example 1 except for not performing reflux in the first vertical stirring reactor (entire distillation). Because the molecular weight of the polycarbonate did not reach the predetermined level, the molar ratio of raw materials was changed to ISB/CHDM/DPC=0.500/0.500/0.970, then, the molecular weight reached the predetermined level.

The pellet YI value of the obtained polycarbonate was 9.5 and the color tone was good, but the molar ratio of dihydroxy compound structural units in the polycarbonate was ISB/CHDM=53.5/46.5 and greatly deviated from the charge composition. Also, the dihydroxy compound content in the liquid distillates coming out of all reactors was 5.4 wt %, revealing increased distillation of an unreacted monomer as compared with Example 1, and the purity of the recovered phenol was reduced. The results are shown in Table 2.

It is seen from the results shown in Table 2 that by appropriately setting the reaction conditions of the first-stage reactor, the quality of the polycarbonate can be enhanced and at the same time, since distillation of an unreacted monomer is suppressed, the polymerization reaction and the physical properties of the resin can be controlled. Furthermore, it is seen that a cost advantage in terms of raw material consumption rate, phenol recovery an the like is obtained.

TABLE 1

| | Temperature ° C. | Pressure kPa | Average Residence Time minutes |
|---|---|---|---|
| First vertical stirring reactor | 195 | 26.7 | 80 |
| Second vertical stirring reactor | 195 | 20.0 | 45 |
| Third vertical stirring reactor | 215 | 7.5 | 30 |
| Fourth vertical stirring reactor | 230 | 0.1 | 90 |

TABLE 2

| | | | Example 1 | Example 2 | Example 3 | Comparative Example 1 | Comparative Example 2 |
|---|---|---|---|---|---|---|---|
| First vertical stirring reactor | Internal temperature | ° C. | 194-196 | 184-186 | 194-196 | 193-197 | 194-196 |
| | Temperature of heating medium | ° C. | 217 | 228 | 210 | 205 | 215 |
| | Internal pressure | kPa | 25-27 | 25-27 | 25-27 | 98-103 | 25-27 |
| | Average residence time | min | 80 | 80 | 80 | 80 | 80 |
| | Phenol distillation percentage | % | 68 | 45 | 69 | 5 | 71 |
| | Reflux ratio | — | 1.3 | 7.5 | 0.1 | 0 | 0 |

TABLE 2-continued

|  |  |  | Example 1 | Example 2 | Example 3 | Comparative Example 1 | Comparative Example 2 |
|---|---|---|---|---|---|---|---|
|  | Composition of reaction solution | Phenol content | wt % | 9.6 | 13.5 | 9.1 | 22.0 | 7.8 |
|  |  | Dihydroxy compound content | wt % | 1.0 | 3.0 | 1.0 | 18.0 | 0.8 |
|  | Composition of liquid distillate | Dihydroxy compound content | wt % | <0.1 | <0.1 | <0.1 | <0.1 | 7.6 |
| Second vertical stirring reactor | Internal temperature | °C. | 195 | 195 | 195 | 195 | 195 |
|  | Temperature of heating medium | °C. | 211 | 211 | 208 | 218 | 210 |
|  | Internal pressure | kPa | 20 | 20 | 20 | 20 | 20 |
|  | Average residence time | min | 45 | 45 | 45 | 45 | 45 |
|  | Reflux ratio | — | 0.1 | 0.1 | 0.1 | 0.1 | 0.1 |
| Third vertical stirring reactor | Internal temperature | °C. | 215 | 215 | 215 | 215 | 215 |
|  | Temperature of heating medium | °C. | 218 | 218 | 218 | 218 | 218 |
|  | Internal pressure | kPa | 7.5 | 7.5 | 7.5 | 7.5 | 7.5 |
|  | Average residence time | min | 30 | 30 | 30 | 30 | 30 |
| Fourth horizontal stirring reactor | Internal temperature | °C. | 228 | 228 | 228 | 228 | 228 |
|  | Temperature of heating medium | °C. | 230 | 230 | 230 | 230 | 230 |
|  | Internal pressure | kPa | 0.1 | 0.1 | 0.1 | 0.1 | 0.1 |
|  | Average residence time | min | 90 | 90 | 90 | 90 | 90 |
| Polycarbonate | Ratio of structural units | ISB | mol % | 50.1 | 50.0 | 50.1 | 50.1 | 53.5 |
|  |  | CHDM | mol % | 49.9 | 50.0 | 49.9 | 49.9 | 46.5 |
|  | Reduced viscosity | dL/g | 0.645 | 0.603 | 0.640 | 0.615 | 0.650 |
|  | Pellet YI | — | 9.7 | 15.6 | 9.5 | 20.5 | 9.5 |
| Liquid distillates from all reaction stages | Composition of liquid distillate | Dihydroxy compound content | wt % | 0.2 | 0.1 | 0.2 | 0.1 | 5.4 |

In Table 2, when the values of the internal temperature and the internal pressure are constant, this indicates that no variation was generated in the operation for 24 hours.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2011-001790) filed on Jan. 7, 2011, the contents of which are incorporated herein by way of reference.

INDUSTRIAL APPLICABILITY

According to the present invention, a method for efficiently and stably producing a polycarbonate excellent in the light resistance, transparency, color hue, heat resistance, thermal stability, mechanical strength and the like can be provided.

EXPLANATIONS OF REFERENCE SIGNS

1a: Raw material (carbonic acid diester) feed port
1b, 1c: Raw material (dihydroxy compound) feed port
1d: Catalyst feed port
2a: Raw material mixing tank
3a: Anchor-type stirring blade
4a: Raw material feed pump
4b: Gear pump
5a: Raw material filter
6a: First vertical stirring reactor
6b: Second vertical stirring reactor
6c: Third vertical stirring reactor
6d: Fourth horizontal stirring reactor
7a, 7b, 7c: MAXBLEND blade
7d: Twin-shaft spectacle-shaped stirring blade
8a, 8b: Internal heat exchanger
9a, 9b: Reflux condenser
10a, 10b: Reflux tube
11a, 11b, 11c, 11d: Distillation tube
12a, 12b, 12c, 12d: Condenser
13a, 13b, 13c, 13d: Decompressor
14a: Liquid distillate recovery tank

The invention claimed is:

1. A method for producing a polycarbonate, comprising:
continuously feeding a dihydroxy compound containing a dihydroxy compound having a portion represented by the following formula (1) in a part of a structure thereof and a carbonic acid diester; and
continuously performing polycondensation to produce a polycarbonate,
wherein all of the following conditions (A) to (D) are satisfied:
(A) at least two reactor vessels connected in series are used,
(B) a reaction solution reacted in a first reactor of the first vessel is continuously fed to a second reactor of the second vessel,
(C) the first reactor is equipped with a reflux condenser, and
(D) a reflux ratio in the first reactor is from 0.01 to 10 based on a distillate volume:

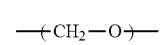
(1)

provided that a case where the portion represented by formula (1) is a portion constituting a part of —$CH_2$—OH is excluded.

2. The production method of a polycarbonate according to claim 1,
wherein an internal temperature of the first reactor is from 150 to 250° C. and a variation of the internal temperature is within 10° C.

3. The production method of a polycarbonate according to claim 1,
wherein an internal pressure of the first reactor is from 5 to 80 kPa and a variation of the internal pressure is within 5 kPa.

4. The production method of a polycarbonate according to claim 1,
wherein a temperature of a heating medium of the first reactor is 265° C. or less and a temperature difference from an internal temperature of the first reactor is from 5 to 80° C.

5. The production method of a polycarbonate according to claim 1,
wherein the second reactor is equipped with a reflux condenser.

6. The production method of a polycarbonate according to claim 1,
wherein an internal volume of the first reactor is 20 L or more.

7. The production method of a polycarbonate according to claim 1,
wherein a distillate volume of a monohydroxy compound generated as a by-product by a transesterification reaction in the first reactor is from 30 to 90% of a theoretical amount.

8. The production method of a polycarbonate according to claim 1,
wherein a content of a monohydroxy compound in the reaction solution at an outlet of the first reactor is 20 wt % or less.

9. The production method of a polycarbonate according to claim 1,
wherein out of the dihydroxy compounds, a boiling point at 5 kPa of at least one dihydroxy compound is 250° C. or less.

10. The production method of a polycarbonate according to claim 1,
wherein an average molecular weight of the dihydroxy compound used for reaction is 220 or less.

11. The production method of a polycarbonate according to claim 1,
wherein the dihydroxy compound having the portion represented by formula (1) is a compound having a cyclic ether structure.

12. The production method of a polycarbonate according to claim 1,
wherein the dihydroxy compound having the portion represented by formula (1) is a compound represented by the following formula (2):

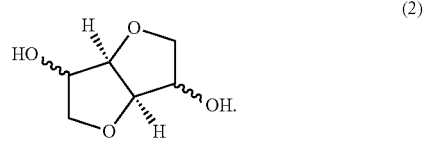

13. The production method of a polycarbonate according to claim 1, comprising:
a step of distilling and purifying a monohydroxy compound from liquid distillates coming out of all reactors and recovering the monohydroxy compound.

14. The production method of a polycarbonate according to claim 7,
wherein the monohydroxy compound is phenol.

* * * * *